No. 852,231. PATENTED APR. 30, 1907.
D. A. KENNEDY.
LOG TURNER.
APPLICATION FILED APR. 26, 1905.
4 SHEETS—SHEET 3.
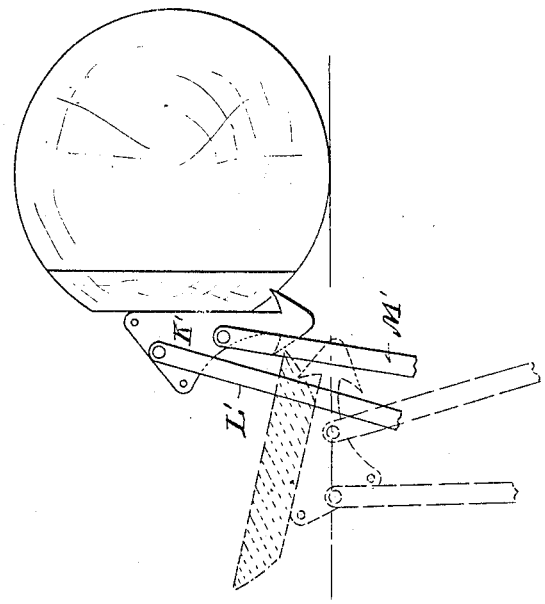
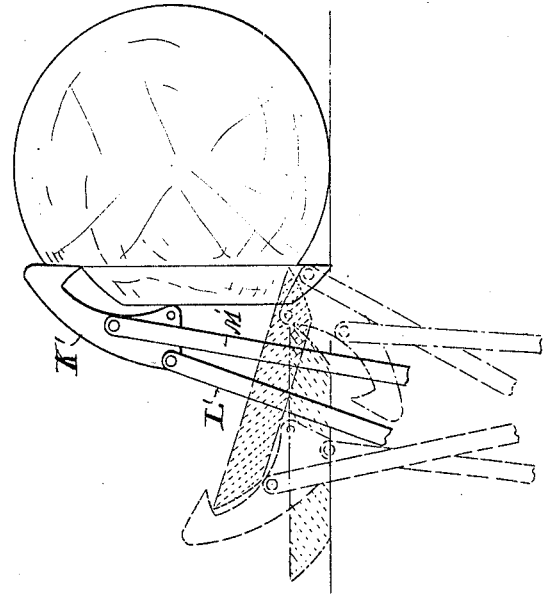
Witnesses
Geo. W. Young
N. E. Oliphant
Inventor
D. A. Kennedy
By H. G. Underwood
Attorney

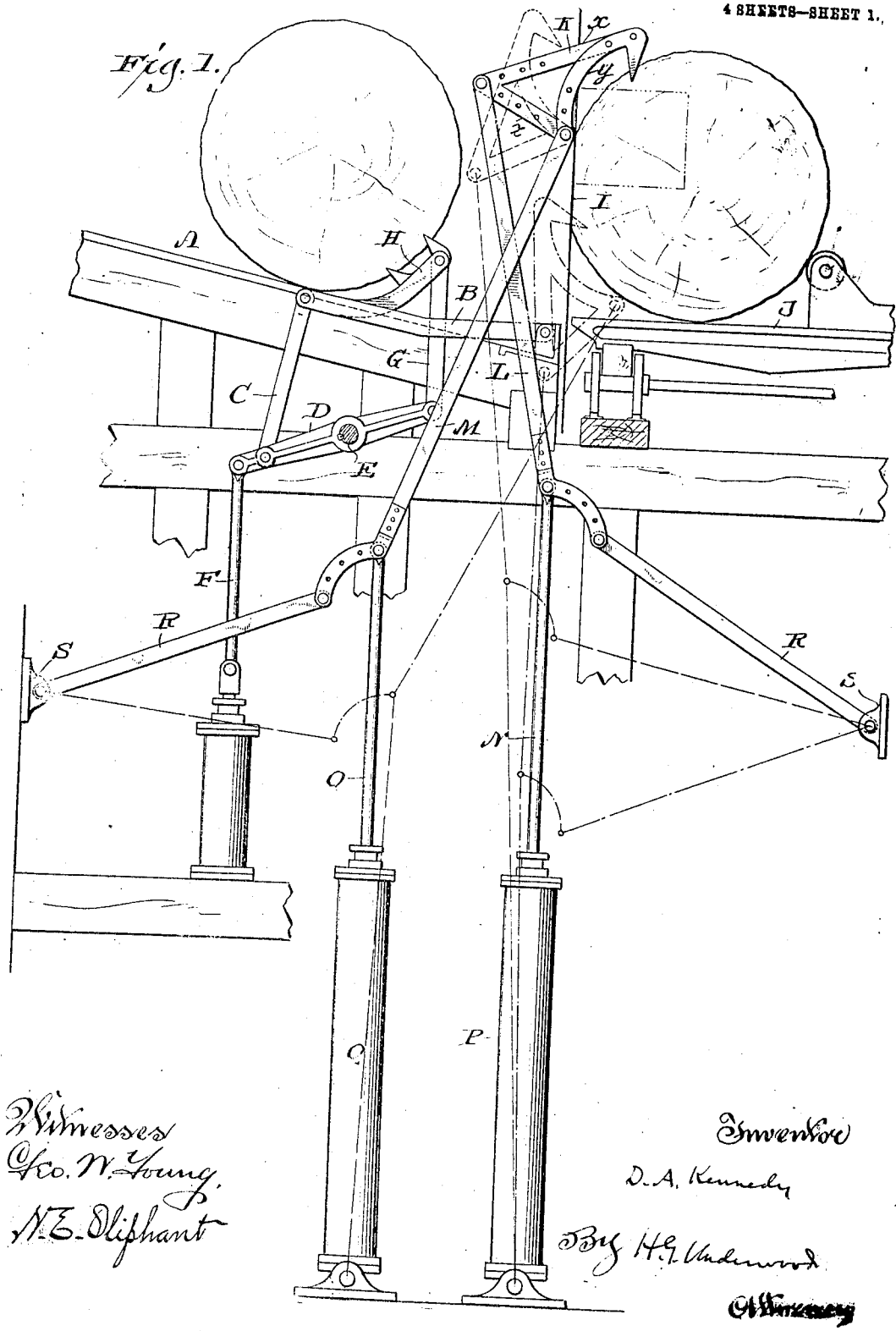

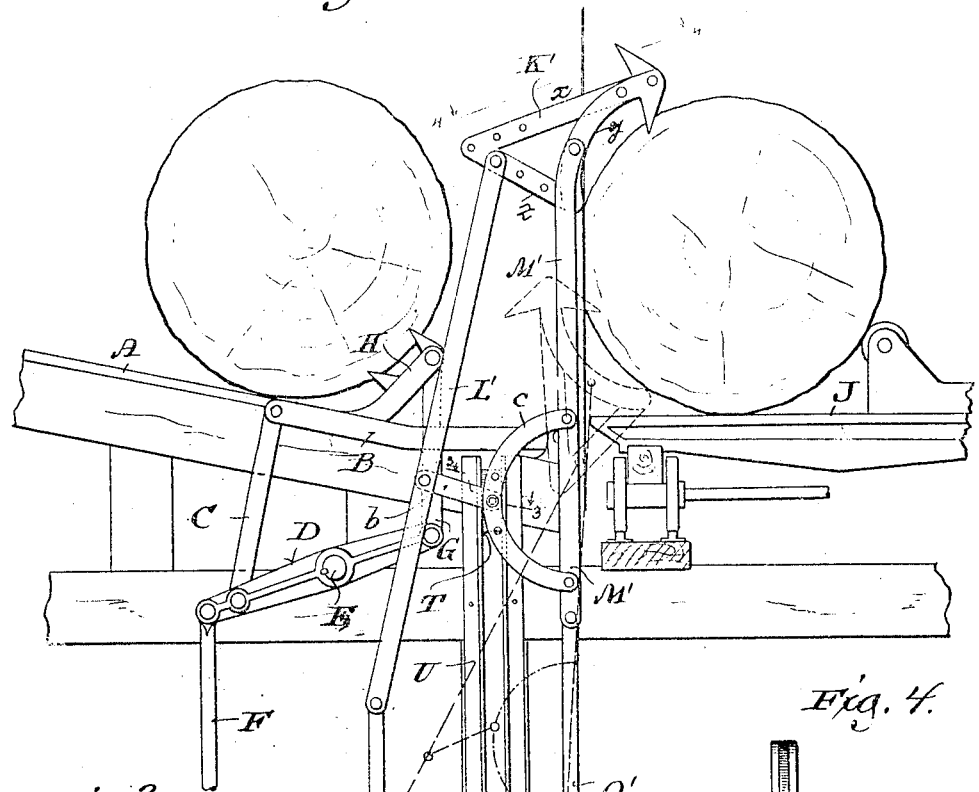

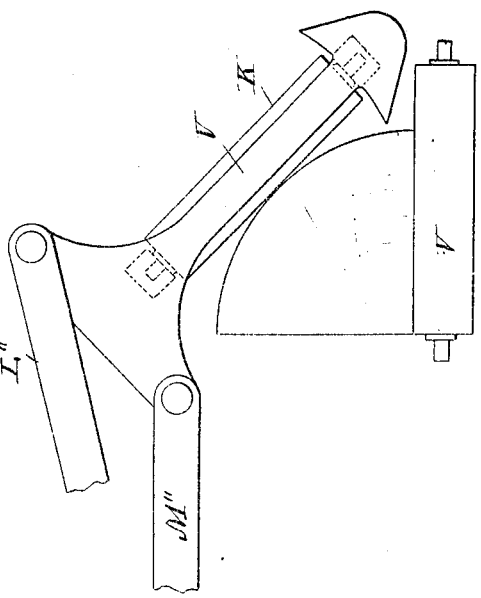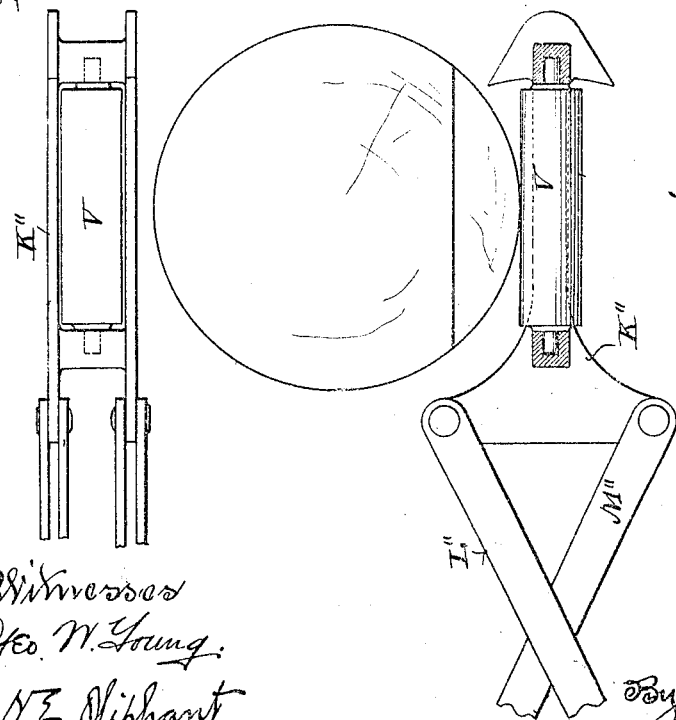

UNITED STATES PATENT OFFICE.

DONALD A. KENNEDY, OF ASHLAND, WISCONSIN.

LOG-TURNER.

No. 852,221.   Specification of Letters Patent.   Patented April 30, 1907.

Application filed April 26, 1905. Serial No. 257,404.

*To all whom it may concern:*

Be it known that I, DONALD A. KENNEDY, a citizen of the United States, and a resident of Ashland, in the county of Ashland and State of Wisconsin, have invented certain new and useful Improvements in Log-Turners; and I do hereby declare that the following is a full, clear, and exact description thereof.

My invention consists in certain peculiarities of construction and combination of parts herein specified with reference to the accompanying drawings and subsequently claimed, its object being to provide simple, economical and efficient log-turners having the various uses and advantages hereinafter set forth.

Figures 1 and 2 of the drawings represent elevations of as many different forms of my improved log-turner, and also illustrate a log-deck and log-carriage; a slide and guide shown in Fig. 3, being omitted in Fig. 2; Fig. 3, a sectional view of a fragment of one form of the log-turner, the same being indicated by lines 3—3 in Fig. 2; Fig. 4, a plan view of another fragment of said log-turner indicated by line 4—4 in said Fig. 2; Figs. 5 and 6, diagrams illustrating operations of the log-turner; Fig. 7, a side elevation, partly in section, of a fragment of another form of the log-turner employed as a support for a moving plank and log; Fig. 8, a back view of said fragment of the latter form of the invention, and Fig. 9, a side elevation of the same opposing a log-quadrant supported on a re-saw roller.

Referring by letter to the drawings, A indicates a log-deck, B one of a plurality of parallel skids in pivotally adjustable connection with the incline of said deck, the upper end of the skid being in pivotal connection with a vertically disposed pitman C likewise connected to an arm of a lever D fast on a rock-shaft E and connected to a pitman F that is coupled to a suitable actuating device. Said pitman is shown coupled to the rod of a piston (not shown) that is reciprocated by steam or other fluid-under-pressure, in a suitably arranged cylinder. Another arm of the lever is connected, by a link G, with a stop-bar H loose at one end on the pivot of said skid, the construction and arrangement of parts thus far described being analogous to what has been previously set forth in my Patent 778366, of December 27, 1904. A saw I is shown between the log-deck and the line of travel of a log-carriage J, this carriage being of ordinary construction. The log-turner herein particularly set forth is positioned in practice similar to those ordinarily employed, and in any of its several forms, it comprises an approximately triangular canter-head having one or two hook-points at the apex thereof and a pair of pitmen (crossed or otherwise) in connection with said head, these pitmen being also coupled to the rods of pistons reciprocated by steam or other suitable fluid-under-pressure, in preferably oscillative cylinders. The connection of each pitman with the canter-head is adjustable or otherwise, as preferred for various operations, and each connection constitutes an axis for said head.

In Figs. 1 and 2, the canter-head K of the log-turner has a straight side $x$ and a curvilinear side $y$. Adjacent to its sides and base $z$ in Fig. 1, the canter-head is provided with a series of apertures, and crossed pitmen L, M, are held in adjustable connection with said head, by pivot-bolts engaging selected apertures in the series. By having the pitmen in adjustable connection with the canter-head, the leverage on same may be varied. The pitmen are respectively coupled to the rods N, O, of pistons that have their reciprocation in cylinders P, Q, these cylinders being preferably pivoted so as to be oscillative. In preferably adjustable connection with the lower offset segment end of each pitman is a link R that is also in connection with a bracket S stationary on a suitable support. Links of different length may be employed to connect the pitmen and brackets aforesaid, the function of the links being to guide the piston-rods N, O, in substantially rectilinear lines, the cylinders P, Q, being oscillative to compensate for slight departure of said rods from rectiline lines due to the arc of movement of the outer ends of said links.

In Fig. 2, the pitmen L', M', are not crossed, but the pitman L' is connected by a link $b$ with a segmental projection $c$ of the pitman M', and this pitman and the link are in connection with a slide T for which a vertical guide U is provided. The pitman-projection $c$ is provided with a plurality of pivot-pin apertures to provide for adjustable connection therewith of the link $b$, and the function of said link and guided pitman-projection is the same as the links R in connection with the crossed pitmen L, M, in Fig. 1. It being understood that the pivot-pin connecting the link $b$ and pitman-projection $c$ also engages the adjacent slide T. The canter-head K' of the log-turner shown in Fig. 2, has two hook-point projections at its apex in opposite directions, while in Fig. 1, said head has a single hook-point on its curvilinear side. The canter-head shown in Figs. 1, 2 and 4, comprises a plurality of plates bolted together, and each pitman is shown as comprising a pair of parallel plates straddling said head, as is clearly shown in Fig. 4. In Fig. 3, it is shown that the segmental projections c of the plates pertaining to the pitman M' straddle the link b to which they are connected, and the slide in connection with said projections and link comprises two blocks each having its own guide.

In Figs. 7, 8 and 9, the canter-head K'' of the log-turner is a two hook-point device comprising a pair of plates spaced apart, the whole being a single casting or otherwise, and a roller V is journaled in the spacers to project in opposite directions from said head longitudinally of the same. In Figs. 1 and 2 the canter-head is shown by full lines, in position prior to commencing to turn a log on the carriage, and fluid-under-pressure being properly applied in the cylinders P, Q, or P' Q', a straight downward motion is had by said head. By increasing the pull of the piston rod N or N', the log will be turned in the direction of its circumference, the canter-head keeping the same relative position as when the operation begun. Now by pushing the pitman M or M' upward and pulling the pitman L or L' downward, the canter-head is swung approximately one quarter of a turn on one of its pivots to the position shown by dotted lines, after which a slight upward movement of said pitman L or L' and downward movement of said pitmen M or M' will result in the point of said head being released from the log and dropped below the deck-line. At the proper time, the canter-head is again brought into engagement with the log, by proper manipulation of the pitmen connecting it with the piston-rods, the approach of said head to attach said log being shown by dotted lines in Fig. 1. When the log is squared, the canter-head is manipulated by the piston-rods and pitmen to hook over the upper outer edge of the timber prior to a turning operation, said timber being indicated by dotted lines in Fig. 1. The turning operation for the timber is the same as for a log.

In Fig. 5, it is shown that the canter-head may be manipulated to lower a plank cut from a log, the various positions of said head being shown by full and dotted lines. The canter-head in said Fig. 6 is of the same form as the one shown in Fig. 2, and is shown adjusted to have the back point or hook thereof engage a plank to support the same when separated from the log. It is also shown, by dotted lines, in Fig. 6, that the canter-head may be manipulated to lower and push said plank away from a vertically cutting saw.

In Fig. 7, the canter-head having a roller therewith is shown employed to support a plank and log while in motion in a direction opposite to the lower straight portion of a horizontal band-saw, and in Fig. 9, the same form of head is shown, as a means for holding a log-quadrant on a re-saw roller while in motion, the roller V with said head being in contact with said log-quadrant.

Having thus described my invention, what I claim as new, and desire to secure by Letters-Patent, is:—

1. A log-turner comprising a canter-head of approximately triangular form hook-pointed at the apex as well as provided with a series of apertures adjacent to its sides and base, and pitmen in pivot-bolt connection with selected apertures in the series.

2. A log-turner comprising a canter-head of approximately triangular form hook-pointed at the apex, a roller journaled in connection with said head longitudinally of the same to project therefrom in opposite directions, and pitmen in connection with the aforesaid head for which each connection constitutes an axis.

3. A log-turner comprising a canter-head of approximately triangular form hook-pointed at the apex, pitmen having ends thereof in pivotal connection with said head, piston-rods with which the other ends of the pitmen are in pivotal connection, oscillative cylinders in which the rods aforesaid are reciprocative, and means in connection with said pitmen for guiding the piston rods in substantially rectilinear lines, oscillation of the cylinders serving to compensate for slight departure of said rods from said lines incidental to the movements of said pitmen and their connections.

4. A log-turner comprising a canter-head of approximately triangular form hook-pointed at the apex, pitmen having ends thereof in pivotal connection with said head, piston-rods with which the other ends of the pitmen are in pivotal connection, oscillative cylinders in which the rods aforesaid are reciprocative, a slide and vertical guide for same, and a link connecting one of the pitmen with a projection of the other, a pivot-pin joining the link and pitman projection being in connection with the slide aforesaid.

5. A log-turner comprising a canter-head of approximately triangular form hook-pointed at the apex, pitmen having ends thereof in pivotal connection with said head, piston-rods with which the other ends of the pitmen are in pivotal connection, oscillative cylinders in which the rods aforesaid are reciprocative, a slide and vertical guide for same, a segment-projection of one of the pitmen, and a link by which adjustable connection is had of the other pitman with the segment-projection of the one aforesaid, a pivot-pin joining the link and pitman-projection being in connection with the slide aforesaid.

6. A log-turner comprising a canter-head of approximately triangular form hook-pointed at the apex, a pair of pitman each in pivotal connection with the head, actuating mechanism for the pitmen, and means controlling the movement of said pitmen to effect a combined forward pull and rock of the canter-head in proportion to the roll of the log turned by same, whereby the relative position of said head with respect to said log remains the same throughout the turning operation and pressure is exerted against the aforesaid log toward adjacent head-blocks.

7. A log-turner comprising a canter-head of approximately triangular form hook-pointed at the apex in opposite directions, one of its sides being curvilinear and the other straight; and means in conjunction with said head to present either side of same to the log, and to vary the manipulation of said head with respect to turning the log or for supporting and lowering a plank cut therefrom.

In testimony that I claim the foregoing I have hereunto set my hand at Ashland, in the county of Ashland and State of Wisconsin in the presence of two witnesses.

DONALD A. KENNEDY.

Witnesses:
 J. D. KENNEDY,
 DAVID McGRATH.